United States Patent [19]

Lardiere, Jr. et al.

[11] Patent Number: 4,894,569
[45] Date of Patent: Jan. 16, 1990

[54] ELECTRO-EXPULSIVE SEPARATION APPARATUS

[75] Inventors: Benjamin G. Lardiere, Jr., Milford; Joshua I. Goldberg, Woodbridge, both of Conn.

[73] Assignee: Dataproducts New England, Inc., Wallingford, Conn.

[21] Appl. No.: 205,637

[22] Filed: Jun. 13, 1988

[51] Int. Cl.⁴ .................. B64D 15/00; H02K 3/04
[52] U.S. Cl. .................. 310/10; 244/134 D; 318/116
[58] Field of Search .................. 244/134 D; 318/116, 318/132; 335/195; 310/10, 21, 27, 273

[56] References Cited

U.S. PATENT DOCUMENTS

| 3,809,341 | 5/1974 | Levin et al. ............... 244/134 R |
| 4,646,041 | 2/1987 | Howell ....................... 335/195 |
| 4,678,144 | 7/1987 | Goehner et al. ........... 244/134 D |
| 4,690,353 | 9/1987 | Haslim et al. ............. 318/116 |

Primary Examiner—Patrick R. Salce
Assistant Examiner—D. L. Rebsch
Attorney, Agent, or Firm—Bachman & LaPointe

[57] ABSTRACT

An electro-expulsive apparatus including at least two superposed, flexible flat, separately jacketed continuous ribbons of metallic electrical conductor disposed within a sealed outer jacket so that portions of said separately jacketed electrical conductors are separable within said outer jacket to create a void when said conductors are energized simultaneously by an electrical current. The disclosure also includes the method of manufacture.

9 Claims, 2 Drawing Sheets

ELECTRO-EXPULSIVE SEPARATION APPARATUS

BACKGROUND OF THE INVENTION

The present invention relates to electro-expulsive separation devices and relates in particular to such devices which are operable in virtually explosive fashion to shatter and remove a solid body on the surface of such devices.

A representative prior art device is shown and described in U.S. Pat. No. 4,690,353 entitled ELECTRO-EXPULSIVE SEPARATION SYSTEM, issued Sept. 1, 1987 to Haslim et al.

In this unit the electrical conductor is formed from a blank of suitable metal creating a pattern of continuous ribbons in zig-zag fashion with intervening gaps.

The pattern is then folded about an axis 36 to define two sections 37 and 38 as is most apparent in FIG. 3 of the '353 patent; the folding step creates a plurality of ribbon hinges.

While the device of the '353 patent is operative it has a significant disadvantage; i.e., the occurrence of stress cracking, metal fatigue and conductor failure at any one of the numerous hinges arrayed along the axis 36.

In operation, the unit is subject to periodic flexing placing stress on the various hinges; failure of one hinge results in failure of the complete device.

SUMMARY OF THE INVENTION

In contrast, the present invention involves a novel electro-expulsive separation apparatus which does not have the above described disadvantage.

A feature of the present invention is the provision of a pair of separate thin flat electrical conductors in the form of a continuous ribbon having elongated ribbon portions with intervening gaps.

A further feature of the invention is the provision of a first flexible jacket means enclosing substantially each conductor into a discrete packet.

A further feature of the invention is the provision of conductors in the form of layers of thin electrical conductor material stacked in register with one another in a given packet.

A still further feature of the invention is the provision of a tab on the electrical conductors (single or stacked layers) projecting beyond the jacket means facilitating a spot electrical connection between conductors of two adjacent packets.

A still further feature of the invention is the provision of a second flexible jacket means sealing and enclosing at least two packets into a unitary package such that substantial areal portions of the enclosed packets are free to dilate or separate from one another.

A further feature of the invention is the provision of a novel method of manufacturing the electro-expulsive apparatus of the present invention.

Typical method steps involve jacketing and sealing the main body of two conductors individually and separately in a sheath of thermoplastic material, exposing a small tab of each conductor beyond its sheath, superposing one sheathed conductor upon the other so that the conductors are aligned vertically with the tabs in face to face contact, making a spot electrical connection between conductors at said tabs to provide electrical continuity from the conductor of one packet to the conductor of the other packet and thereafter jacketing and sealing both sheathed conductors in thermoplastic material to create a unitary flexible package so that the main body of one sheathed conductor is free to dilate or separate relative to the other.

In situations where the melting points of the thermoplastic materials used in the first and second jacket means are of generally the same value, it is necessary to introduce a flexible sheet of thermoplastic material having a high melting point between adjacent packets. This sheet serves dually as an electrical and as a thermal insulator and insures that the respective packets will separate when energized.

Alternatively, the insulator can be eliminated by sealing only the peripheral margin of the second jacket means thereby insuring that packets will separate.

An apparatus embracing certain features of the invention may comprise at least two discrete electrical conductors, a first flexible jacket means surrounding and sealing substantially each said conductor separately to define individual packets, a tab portion of each conductor being free of said first jacket means, a spot electrical connection between said conductors at said tab portion, a second flexible jacket means enclosing and sealing said jacketed packets and said electrical connection into a unitary package, said jacketed packets being separable within said second flexible jacket means to create a void between said jacketed packets in response to a magnetic field developed when said electrical conductors are energized by an electric current.

Other features and advantages of the present invention will become more apparent from an examination of the succeeding specification when read in conjunction with the appended drawings, in which;

DETAILED DESCRIPTION OF THE INVENTION

Figure 1:
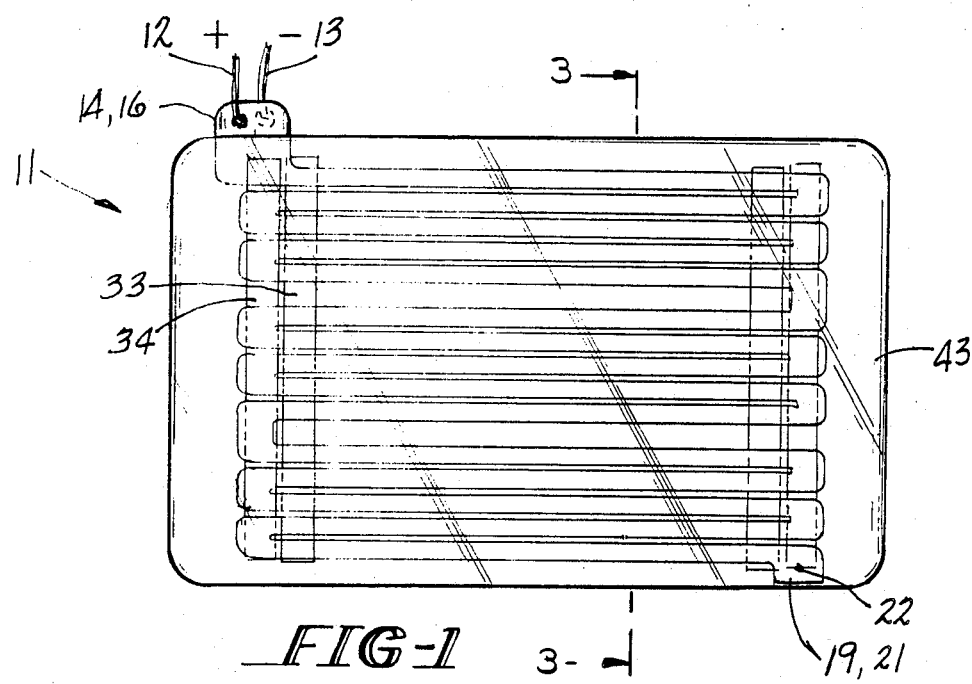
FIG. 1 is a plan view of a fully fabricated expulsive apparatus.
Figure 5:
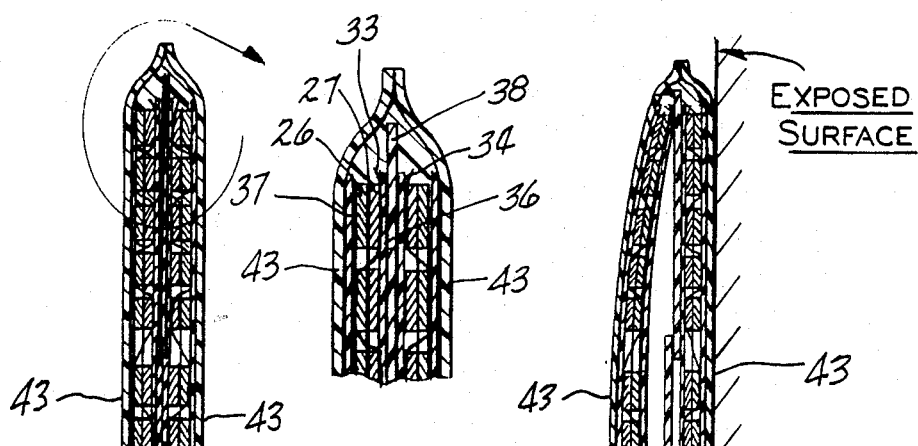
FIG. 5 is an enlarged view of a portion of FIG. 3.
Figures 3, 4:
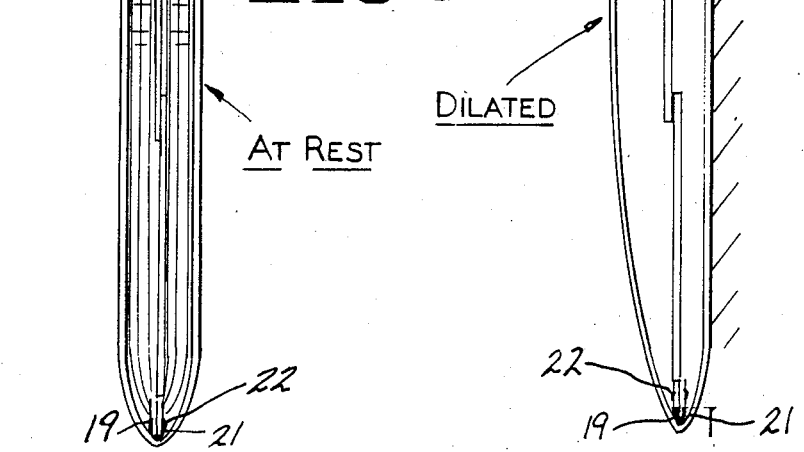
FIG. 3 is a vertical sectional view of FIG. 1 along the line 3—3 as viewed in the direction of the arrows.
FIG. 4 is a view similar to FIG. 3 showing separation between packets.

The reference numeral 11 indicates an electro-expulsive apparatus having electrical terminals 12 and 13 extending from large conductor tabs (first set of tabs) 14 and 16 individual to conductors 17 and 18, respectively. Small tabs (second set of tabs) 19 and 21, also individual to conductors 17 and 18, respectively, have a spot electrical connection 22 to provide a continuous electrical circuit from terminal 12 through conductors 17 and 18 to terminal 13. Tabs 14 and 16 and their contiguous conductors 17 and 18 are insulated electrically and thermally from one another and the composite unit is enclosed in a jacket means in a manner that will be more apparent as this specification proceeds.

Figure 2:
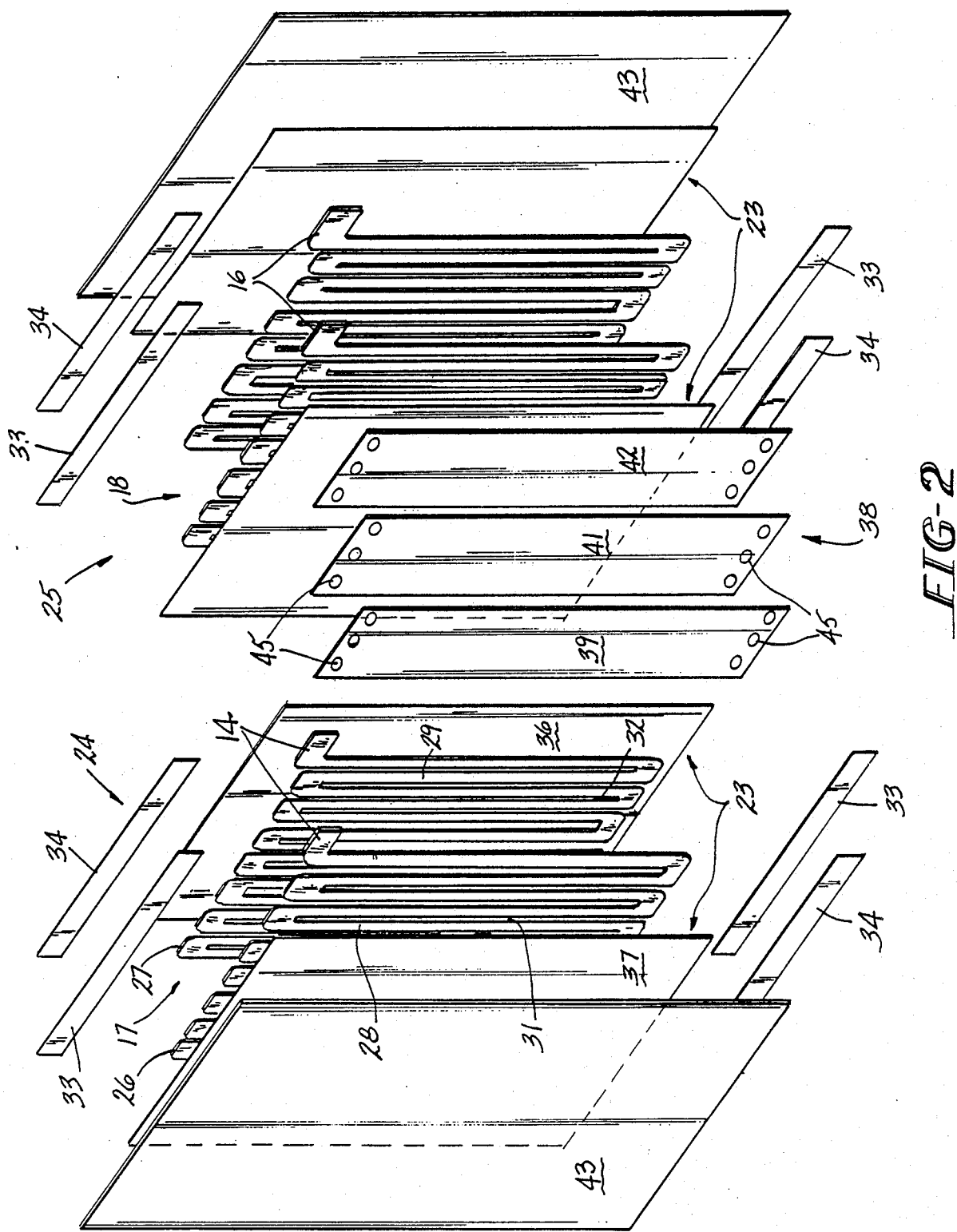
FIG. 2 is an exploded view showing in detail the various elements comprising a typical apparatus.

A reference to the expoded view of FIG. 2 reveals a typical array of pieceparts and jacketing means which make up the apparatus of FIG. 1.

The apparatus comprises two packets 24 and 25 of generally the same composition. Therefore, only packet 24 will be described in detail with the understanding that the description of packet 24 also applies to packet 25.

A first individual packet, indicated generally by the reference numeral 24 includes electrical conductor 17 comprising two flat metallic continuous ribbons 26 and 27 having elongated ribbon portions 28 and 29 with intervening elongated gaps 31 and 32. The conductors range in thickness from 0.001 inches to 0.010 inches. While the conductor 17, in the disclosed embodiment, comprises two flat continuous ribbons 26 and 27, in metal to metal contact, it is entirely within the spirit and scope of the invention that the conductor 17 (and the conductor 18) be of single or multiple ply or layers.

When a conductor, such as a conductor 17, comprises two or more continuous conductor ribbons 26 and 27 the ends of the ribbon portions 28 and 29 are rove, threaded or laced with strands of flexible material 33 and 34 to keep the flat continuous ribbons aligned and in register with one another.

This roving is most apparent in FIG. 1 and is fabricated from a thermoplastic material of a relatively high melting point such as nylon, Teflon or Kapton.

The conductor 17 is then sealed in a first jacket means indicated generally by the reference numeral 23 comprising an inner wall 36 and an outer wall 37. The large tab 14, forming electrode or terminal 12, is within the walls of the first jacket means to isolate the electrode 12 of packet 24 from the electrode 13 of packet 25.

Since the expulsive force generated between the packets 24 and 25, created when the respective conductors 17 and 18 are energized electrically, is inversely proportional to the distance between the conductors, inner wall 36 is of less thickness than the thickness of outer wall 37.

Thickness of inner wall 36 ranges from 0.001 to 0.010 inches while outer wall 37 thickness is of the order of 0.005 to 0.050 inches.

The jacket means 23 (first jacket means) is fabricated of a thermoplastic material of low melting point such as polyurethane, Neoprene or butadiene.

Packets 24 and 25 are separated by a thermal-electrical insulator indicated generally by the reference numeral 38. In the disclosed embodiment, the insulator takes the form of three sheets of flexible material 39, 41 and 42. Obviously the insulator can be a single sheet or multiple sheets, as manufacturing procedures dictate.

Frequently, the insulator 38 is formed with perforations 45 to facilitate keying the insulator to the first jacket means thereby precluding movement of the insulator relative to the first jacket means.

As is the case with the strands 33 and 34 the insulator 38 is fabricated of thermoplastic material of high melting point such as nylon, Teflon or Kapton.

The respective packets 24 and 25 are each sealed within their respective first jacket means 23 by heating the packets to convert the walls 36 and 37 to a hot melt; small tabs 19 and 21 project through the jacket means 23 and are exposed.

During this heating step, hot melt enters the gaps 31 and 32 and also fills perforations 45 to effect the keying action previously described.

This heating procedure preserves the integrity of the strands 33 and 34 because they are fabricated of a relatively high melting point thermoplastic material as stated previously.

After the respective packets 24 and 25 are cooled and sealed, exposed small tabs 19 and 21 are spot welded or soldered at 22, the insulator 38 is sandwiched between sealed packets 24 and 25 and a second jacket means, indicated generally by the reference numeral 41, is created by application of heat to form a hot melt of low melting temperature thermoplastic material in substantially the same manner in which the first jacket means was formed. Usually (but not necessarily) the second jacket means is of the same material as that used to create the first jacket means.

Here again, the integrity of the strands 33 and 34 and the insulator 38 is preserved because of their high melting point relative to the melting point of the first and second jacket means.

Thus the apparatus, in final form, comprises a pair of separable packets 24 and 25 each sealed within first packet means 23 and a composite of packets 24 and 25 sealed within second jacket means 41 with the positive and negative electrodes (connected to large tabs 14 and 16) exposed and the small tabs with spot connection 22 providing electrical circuit continuity between conductors 17 and 18.

The apparatus is then flexible and operable for attachment to a curved or flat air foil or other fixed member which when exposed to a hostile environment is operable to dilate in pulsating fashion to shatter and expel accumulated frangible material such as ice, mud or the like.

The electrical circuitry necessary to activate the expulsive apparatus is well known and does not form a part of the apparatus and method of the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An electro-expulsive separation apparatus comprising:
    at least two discrete electrical conductors,
    a first flexible jacket means surrounding and sealing substantially each conductor separately to define individual packets,
    insulator means sandwiched between said packets,
    said insulator means being keyed to one of said first jacket means to preclude relative motion between said insulator means and said one of said first jacket means,
    a tab portion of each conductor being free of each said first jacket means,
    a spot electrical connection between said conductors at said tab portions,
    a second flexible jacket means enclosing and sealing said jacketed packets including said tab portions into a unitary flexible package, and,
    positive and negative electrodes connected to said conductors, whereby said jacketed packets are separable partially within said second jacket means to create a void between said jacketed packets in response to repelling forces created by a magnetic field developed when said electrical conductors are energized by an electric current.

2. An electro-expulsive separation apparatus comprising:
    at least two discrete electrical conductors,
    a first flexible jacket means surrounding and sealing substantially each conductor separately to define individual packets, the first jacket means of each packet including an inner wall of a first thickness and an outer wall of a second greater thickness, a tab portion of each conductor being free of each said first jacket means, a spot electrical connection between said conductors at said tab portions, a second flexible jacket means enclosing and sealing said jacketed packets including said tab portions into a unitary flexible package, said packets being disposed within said second jacket means so that the inner walls of the first jacket means face one another, insulator means sandwiched between the inner walls of said jacketed packets, said insulator means defining a plurality of overlapping, flexible sheets, said insulator means being provided further with a plurality of perforations to effect a keying connection with one of said first jacket means to fix the position of said insulator means and to stabilize said first jacket means, and positive and negative electrodes connected to said conductors, whereby said jacketed packets are separable partially within said second jacket means to create a void between said jacketed packets in response to repelling forces created by a magnetic field developed when said electrical conductors are energized by an electric current.

3. An electro-expulsive separation apparatus comprising:

at least two discrete electrical conductors, a first flexible jacket means surrounding and sealing substantially each conductor separately to define individual packets, the first jacket means of each packet including an inner wall of a first thickness and an outer wall of a second greater thickness, a tab portion of each conductor being free of each said first jacket means, a spot electrical connection between said conductors at said tab portions, a second flexible jacket means enclosing and sealing said jacketed packets including said tab portions into a unitary flexible package, said packets being disposed within said second jacket means so that the inner walls of the first jacket means face one another, insulator means sandwiched between the inner walls of said jacketed packets, said insulator means defining a plurality of overlapping, flexible sheets, said insulator means being provided with a plurality of perforations to effect a keying connection with one of said first jacket means to fix the position of said insulator means and to stabilize said first jacket means, each said conductor being disposed within a predetermined, well-defined area, said insulator means overlaying each said conductor with marginal portions thereof extending beyond said well-defined area, said perforations being formed in said marginal portions of said insulator means, and positive and negative electrodes connected to said conductors, whereby said jacketed packets are separable partially within said second jacket means to create a void between said jacketed packets in response to repelling forces created by a magnetic field developed when said electrical conductors are energized by an electric current.

4. An electro-expulsive separation apparatus comprising:

at least two discrete electrical conductors, each conductor defining at least one, generally flat, continuous ribbon patterned to define elongated ribbon portions spaced by intervening elongated gaps, each said conductor defining further at least two separate, metallic layers stacked in register upon one another and in intimate areal contact, said layers and said ribbon portions being free to move relative to one another, said ribbon portions and intervening gaps being interwoven with strand material to maintain alignment between ribbon portions of said stacked layers, a first flexible jacket means surrounding and sealing substantially each conductor separately to define individual packets, a tab portion of each conductor being free of each said first jacket means, a spot electrical connection between said conductors at said tab portions, a second flexible jacket means enclosing and sealing said jacketed packets including said tab portions into a unitary flexible package, and, positive and negative electrodes connected to said conductors, whereby said jacketed packets are separable partially within said second jacket means to create a void between said jacketed packets in response to repelling forces created by a magnetic field developed when said electrical conductors are energized by an electric current.

5. An electro-expulsive separation apparatus comprising:

at least two discrete electrical conductors, each conductor defining at least one, generally flat, continuous ribbon patterned to define elongated ribbon portions spaced by intervening elongated gaps, each said conductor defining further at least two separate, metallic layers stacked in register upon one another and in intimate areal contact, said layers being free to move relative to one another, said ribbon portions and intervening gaps being interwoven with strand material to maintain alignment between ribbon portions of said stacked layers, a first flexible, thermoplastic jacket means surrounding and sealing substantially each conductor separately to define individual packets, said strand material defining a thermoplastic polymer of a higher melting point than the melting point of said first jacket means, a tab portion of each conductor being free of each said first jacket means, a spot electrical connection between said conductors at said tab portions, a second flexible jacket means enclosing and sealing said jacketed packets including said tab portions into a unitary flexible package, and, positive and negative electrodes connected to said conductors, whereby said jacketed packets are separable partially within said second jacket means to create a void between said jacketed packets in response to repelling forces created by a magnetic field developed when said electrical conductors are energized by an electric current.

6. The apparatus of claim 1 in which each metallic conductor is copper.

7. The apparatus of claim 1 in which the first jacket means defines a thermoplastic polymer.

8. The apparatus of claim 7 in which the insulator means defines a thermoplastic polymer of a higher melting point than the melting point of said first jacket means.

9. The apparatus of claim 2 in which the thickness of the first wall ranges from 0.001 to 0.010 inches and the thickness of the second wall ranges from 0.005 to 0.050 inches.

* * * * *